July 23, 1935.  E. J. KEARNEY  2,008,983
MACHINE TOOL TRANSMISSION
Filed Nov. 21, 1932    8 Sheets-Sheet 2

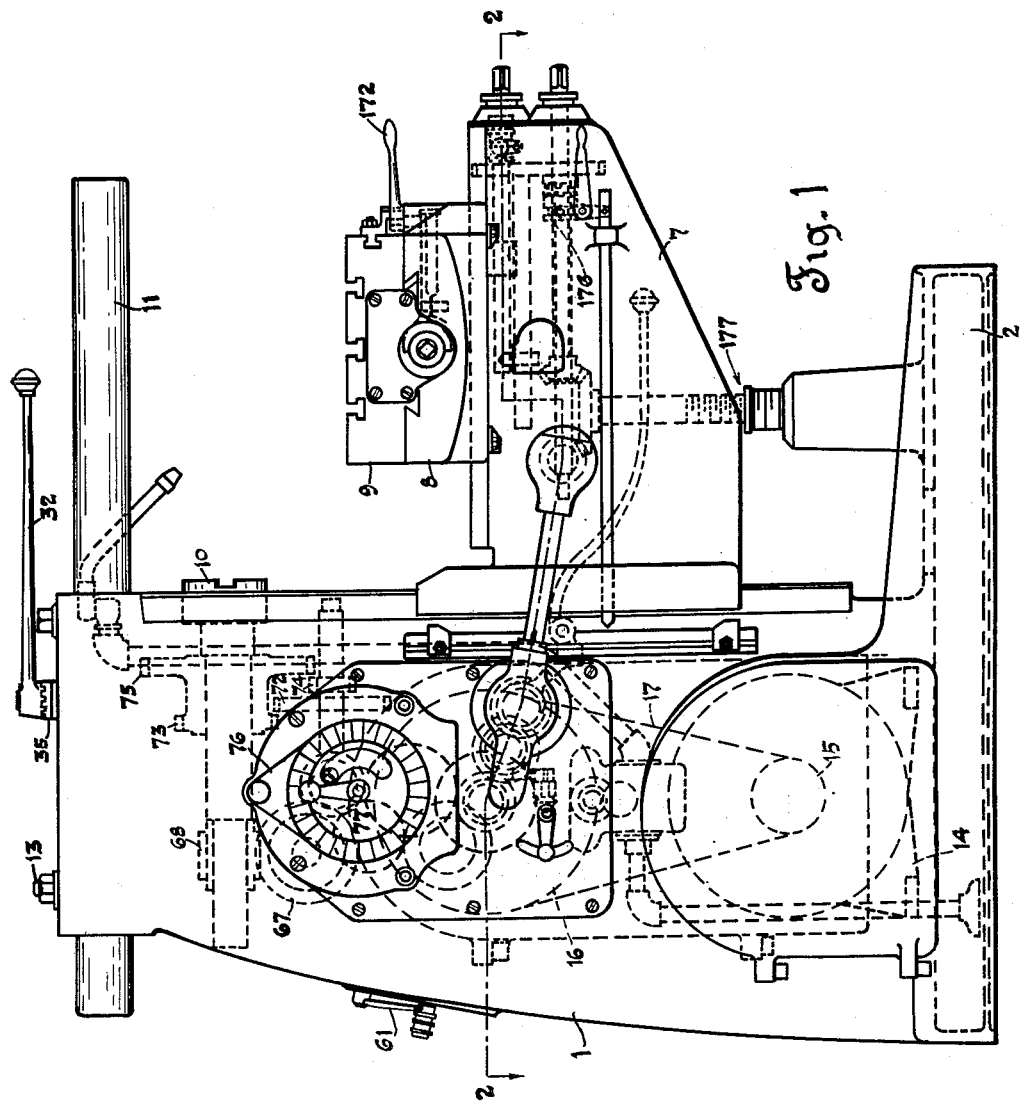

INVENTOR
Edward J Kearney
BY
Fred A Parsons
ATTORNEY

July 23, 1935. E. J. KEARNEY 2,008,983
MACHINE TOOL TRANSMISSION
Filed Nov. 21, 1932 8 Sheets-Sheet 3

INVENTOR
Edward J Kearney
BY
Fred G Parsons
ATTORNEY

July 23, 1935.  E. J. KEARNEY  2,008,983
MACHINE TOOL TRANSMISSION
Filed Nov. 21, 1932  8 Sheets-Sheet 6
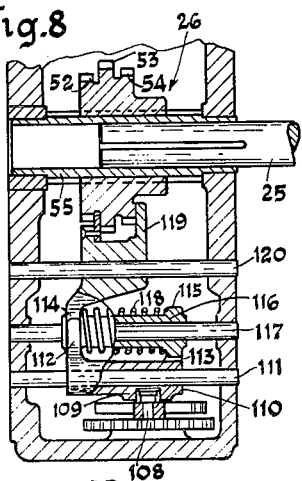
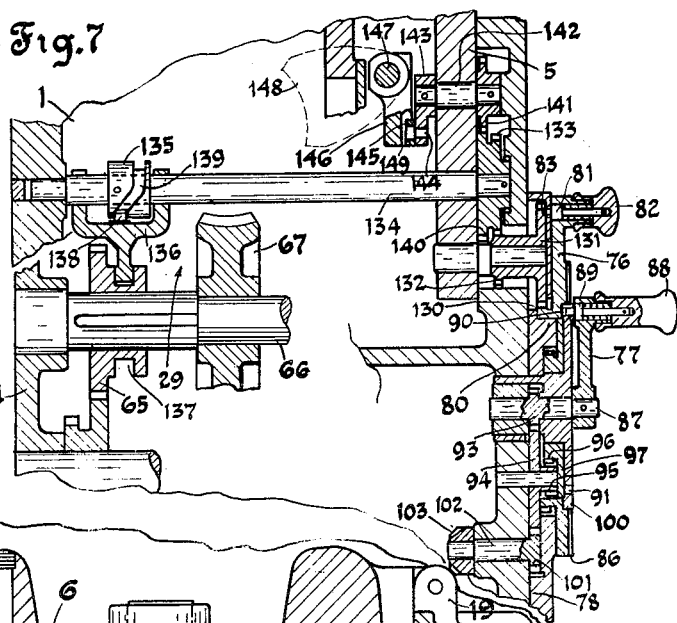
INVENTOR
Edward J. Kearney
BY
Fred A. Parsons
ATTORNEY July 23, 1935.   E. J. KEARNEY   2,008,983
MACHINE TOOL TRANSMISSION
Filed Nov. 21, 1932   8 Sheets-Sheet 7

INVENTOR
Edward J Kearney
BY Fred G Parsons
ATTORNEY

July 23, 1935. E. J. KEARNEY 2,008,983
MACHINE TOOL TRANSMISSION
Filed Nov. 21, 1932   8 Sheets-Sheet 8

INVENTOR
Edward J. Kearney
BY Fred A. Parsons
ATTORNEY

Patented July 23, 1935

2,008,983

UNITED STATES PATENT OFFICE 2,008,983

MACHINE TOOL TRANSMISSION

Edward J. Kearney, Wauwatosa, Wis., assignor to Kearney & Trecker Corporation, West Allis, Wis.

Application November 21, 1932, Serial No. 643,580

10 Claims. (Cl. 90—18)

This invention relates to transmission mechanism for machine tools and more particularly for the tool spindle drive of milling machines.

A primary object of the invention is to provide an improved transmission including a rate changer providing a relatively very high ratio between the slowest and fastest rates available therefrom, and a relatively large number of intermediate rates in preferred sequence.

A further object is to provide an improved rate changer in a form adapted for the requirements of milling machines and particularly the type of milling machine commonly known as the knee type or knee and column type.

Another object is to provide a transmission and rate changer such as mentioned above in an improved relationship with the structure of the machine, particularly the supporting structure of a knee type milling machine.

A further object is to provide a transmission and rate changer in a form particularly adapted for improved control mechanism for change of rate.

Another object is to provide an improved relationship between a spindle transmission and other transmission mechanism, particularly where the machine is a knee type milling machine.

Other objects are generally to improve and simplify the construction and operation of machine tools generally and particularly of milling machines, and still other objects will be apparent from the specification and claims.

The invention consists in the construction, arrangement, and combination of parts as herein illustrated, described, and claimed, and in such modification thereof as is equivalent to the claims.

Fig. 1 is a left side elevation of a milling machine of the knee and column type incorporating the invention.

Fig. 6 is an enlarged horizontal section on the line 6—6 of Fig. 3.

Figs. 7 to 12 inclusive show details of the spindle gear train and gear shifting mechanism.

Figure 13:
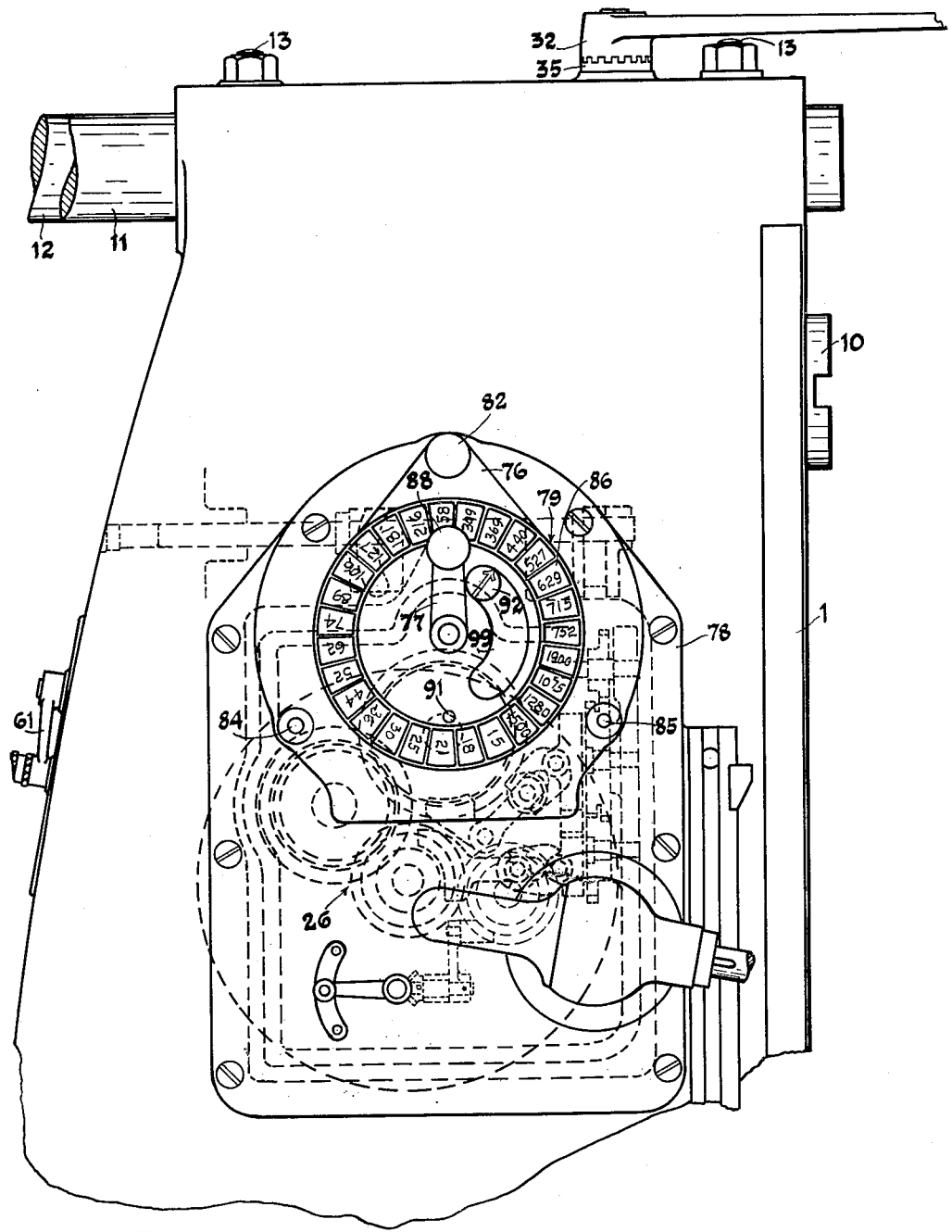

Fig. 13 is a side elevation of a portion of the machine shown in Fig. 1, enlarged.

The machine includes a hollow column 1 having a base 2, a front face or wall 3, side walls 4 and 5 and rear wall 6. A knee 7 is mounted for vertical movement adjacent the front face or wall 3 and carries a cross movable saddle 8 upon which is mounted a longitudinally movable work table 9. At the upper part of the column 1 is a rotatable tool spindle 10 mounted in a front bearing 10a, an intermediate bearing 10b and a rear bearing 10c. Overarms 11, 12 are mounted in the column above the spindle for movement parallel to the spindle axis and may be clamped in adjusted positions by means of bolts 13—13. A driving motor 14 provides a power source for the machine and is housed within the column at a level underneath spindle 10 and in a separate motor chamber as more particularly described in an application, Serial No. 638,667, filed October 20, 1932.

The motor 14 has a pulley 15, which may be of the multiple groove or other well known type, keyed on the motor shaft and which drives a pulley 16 through the flexible driving belts 17. The pulleys 15 and 16 are outside the column wall but are entirely enclosed by a cover or housing member 18 which is hinged on one edge as shown at 19 so that the pulleys can be exposed for inspection or replacement of the belts 17. The motor 14 is adjustably mounted for altering the tension of belts 17 as disclosed in said application, Serial No. 638,667.

Figure 4:
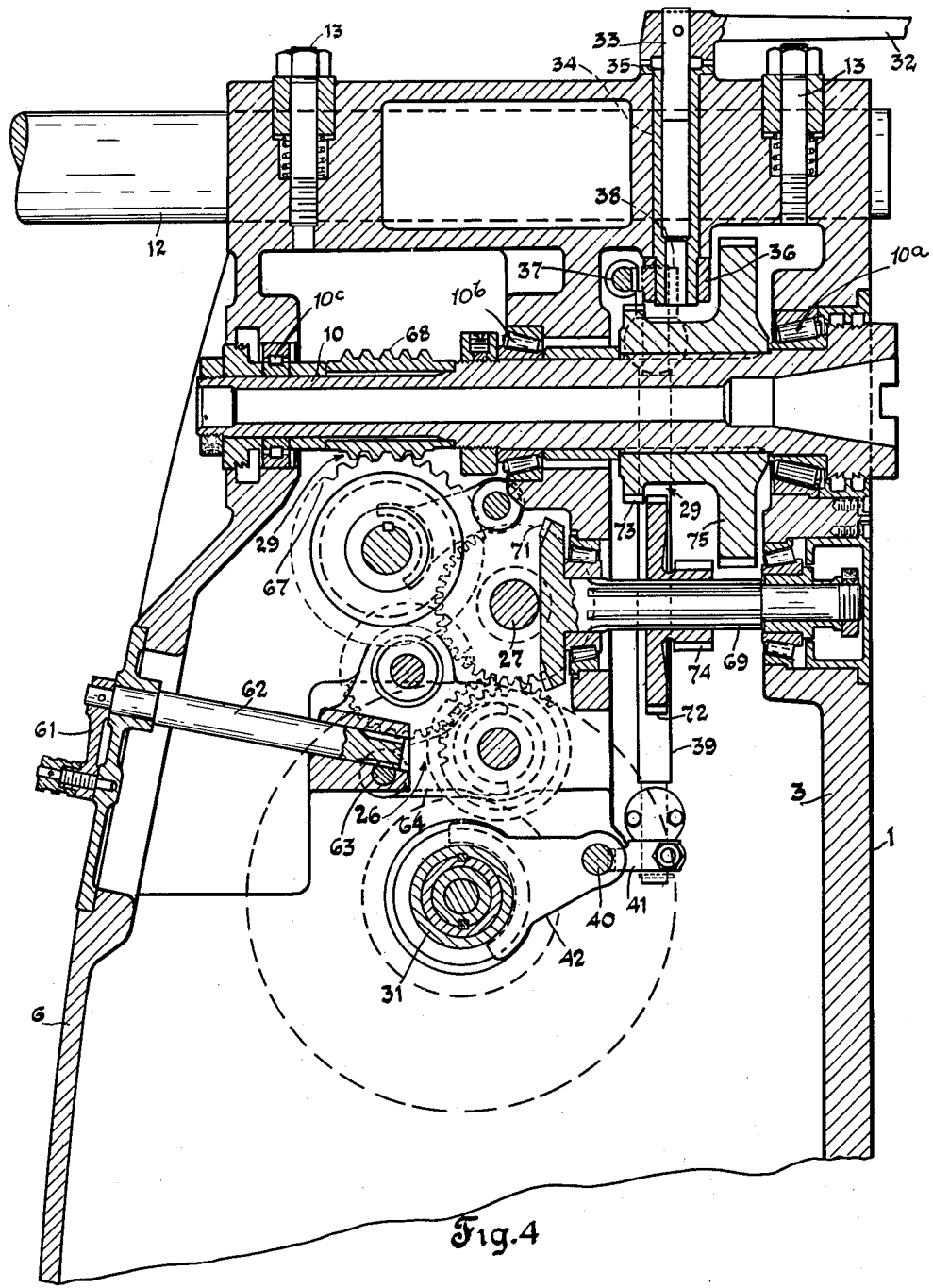
Fig. 4 is an enlarged section taken on the line 4—4 of Fig. 3 showing portions of the spindle gear train, etc. in part of the column of the machine.
Figure 5:
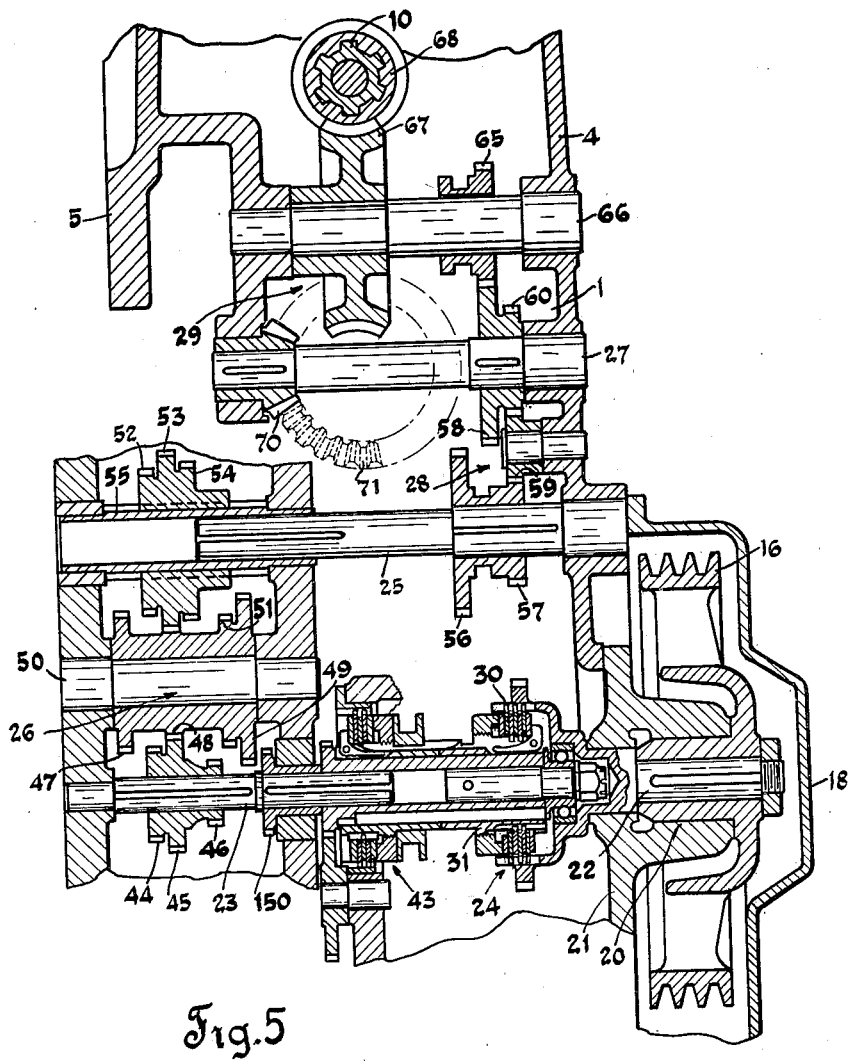
Fig. 5 is a developed section showing certain of the transmission mechanism.
Figure 11:
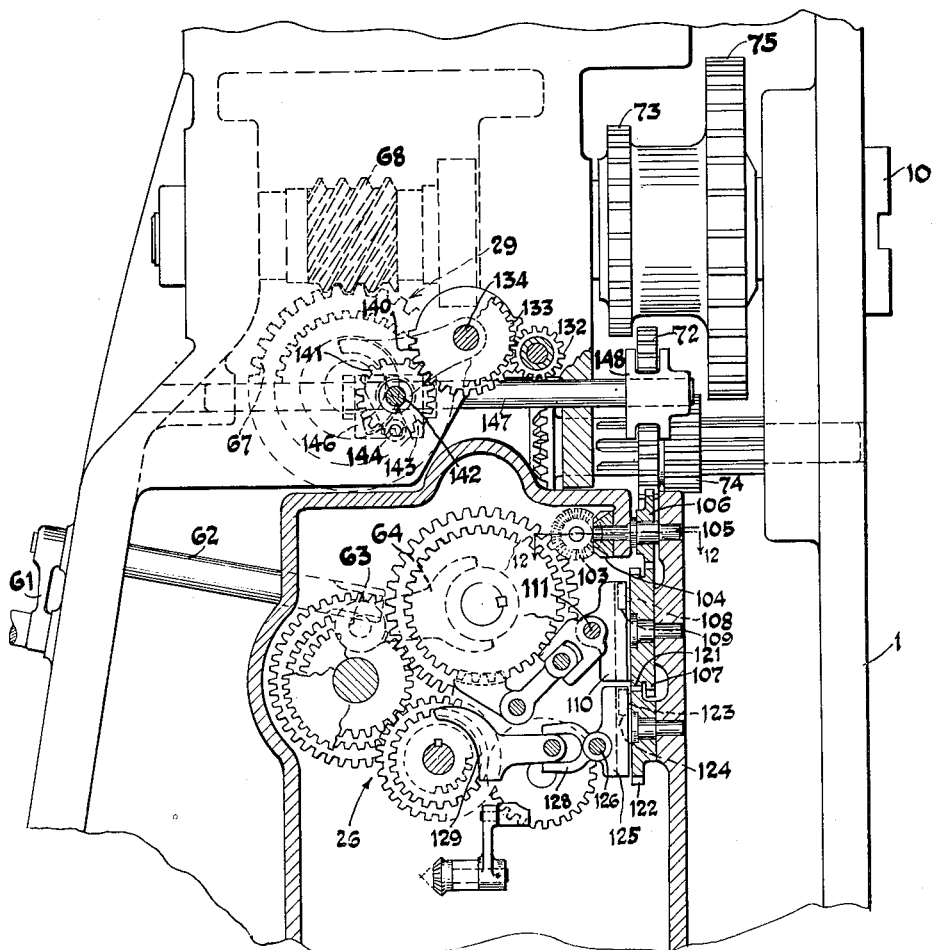
Figure 12:
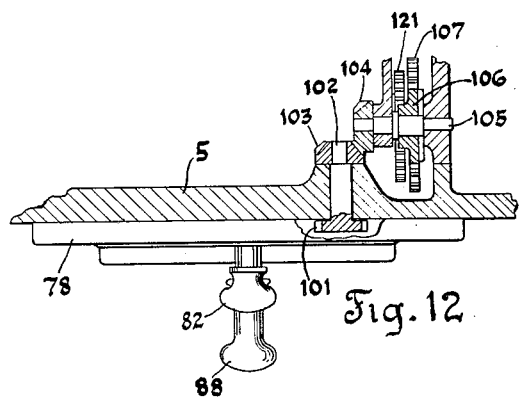

The hub of pulley 16 is journaled in a bearing 20, Fig. 5, formed integrally with a plate 21 which is bolted or otherwise fastened to the wall 4 of the column, and is fixed with a shaft 22, Fig. 5, axially parallel to the shaft of the motor and which drives a shaft 23 through a motion interrupting clutch generally designated as 24. The shaft 23 drives a shaft 25 through a first or primary rate changer, generally designated as 26. The shaft 25 drives a shaft 27 in either direction through a reverser generally designated as 28. The shaft 27 drives the spindle 10 through a second or supplementary rate changer generally designated by the numeral 29, Fig. 4.

The clutch 24, Fig. 5, may be of any type suitable for interrupting and establishing a driving connection between shaft 22 and shaft 23, but, as here shown, is of a type generally known as a multiple plate clutch in which a series of friction elements 30 are alternately engaged or disengaged by the axial shifting of an annular sleeve or member 31. Member 31 is manually shifted by a hand lever 32, Fig. 4, located adjacent the upper end of the machine. The lever 32 is fixed to a shaft 33 which operates a sleeve 34 through a jaw clutch 35. The lower end of sleeve 34 has fixed thereto a gear segment 36, shown in Fig. 6, which operates a rack bar 37. The rack bar 37 engages a segment 38 fixed on a shaft 39, which extends downward and operates a rack bar 40, Fig. 4, through a segment 41. The bar 40 carries a fork 42 engaging a suitable annular groove in the sleeve 31 to move it in either direction.

The movement of sleeve 31 which disengages clutch 24, when continued, engages a brake generally designated by the numeral 43. Brake 43 may be of any suitable form and will, therefore, not be described in detail.

The first or primary rate changer 26 is constructed as follows: Gears 44, 45, 46, Fig. 5, are slidably keyed to the shaft 23 and fixed together for unitary axial movement for engagement one at a time respectively with complementary gears 47, 48, and 49, which are fixed together and rotatably supported on a shaft 50. Another gear 51 is also fixed with gears 47, 48, 49 and the gears 47, 48, 51 are engageable, one at a time, by the gears 52, 53, 54 respectively complementary thereto, the gears last mentioned being fixed together and slidably keyed on a sleeve 55 in driving engagement with the shaft 25. The arrangement is such that the various positions of the shiftable gears provide nine changes of rate between driving shaft 23 and the shaft 25, and since the difference in gear diameters is relatively small, the rate changes effected form a series having relatively small increments.

The reverser 28 is constructed and operated as follows: Slidably keyed on shaft 25, Fig. 5, is a unitary pair of gears 56, 57. In the one position of axial adjustment of the gear pair the gear 56 engages a gear 58 fixed on shaft 27. In another position of axial adjustment the gear 57 engages an idler 59 which drives a gear 60 fixed on shaft 27. The gear pair 56, 57 may be shifted to the one or the other position by the means of a hand lever 61, Fig. 4, fixed on a shaft 62 having gear teeth engaging a rack bar 63 upon which is fixed a fork member 64 which engages a suitable annular groove in the hub of the gear pair.

The second or supplementary rate changer 29 is constructed as follows: A gear 65 is slidably keyed to a shaft 66 and is shiftable into and out of engagement with the gear 58, Fig. 5, whereby to connect or disconnect a high speed train consisting of shaft 66, a helical or worm gear 67 fixed on shaft 66 and a complementary helical pinion or worm 68 fixed on the spindle between the intermediate bearing 10b and rear bearing 10c. Two other power trains are driven from a shaft 69, Fig. 4, which is driven from the shaft 27 by the means of a bevel gear 70, Fig. 5, engaging a bevel gear 71, Fig. 4. The two trains just referred to consist respectively of the gear 72 slidably splined on shaft 69 and engageable with a gear 73 fixed on spindle 10 to form a train of intermediate speed; and a gear 74 slidably splined on shaft 69 and engageable with a gear 75 fixed on spindle 10 to form a low speed train. The gears 72, 74 are fixed together for unitary movement and arranged to be engageable one at a time. The gears 73 and 75 are each fixed between the front bearing 10a and the intermediate bearing 10b, the larger gear for low speed train being directly adjacent the front bearing. The difference in diameter of the gears of the second rate changer is sufficient that increments of rate change effected are larger than the total rate change of the first rate changer. The combined effect of the mechanism described is to give three separate power trains of different rate effect from the shaft 27 to the spindle, which, in combination with the first rate changer, provides twenty-seven changes of spindle speed.

For positioning the various shiftable elements of the rate changers 26, 29 there is provided a speed control mechanism or shifting device which may be of any suitable form, but as here shown is the same as is disclosed in an application, Serial No. 644,040, filed November 23, 1932. As here shown, the control mechanism is operable from a plurality of pivoted levers or arms 76, 77, Fig. 7, carried by a plate or member 78 which is removably attached to the side wall 5 of the column 1 and which also carries a speed indicating device generally denoted by the numeral 79, Fig. 13. The lever 76 is mounted for rotation on a shoulder 80, Fig. 7, of the plate 78 and is provided with a spring pressed plunger 81 and a handle or grip 82 at its outer end. The plunger 81 is fixed in the handle 82 and is adapted to engage with locating holes 83, 84, 85, shown in Figs. 7 and 13. Fixed with the arm 76 is a dial 86 giving the numerical values of the various spindle speeds to be had as a result of shifting the elements of rate changers 26, 29 when the power source consisting of motor 14 is driven at a predetermined constant speed.

The lever 77 is fixed with a shaft 87 rotatably supported from the fixed plate 78, and has a handle 88 and a spring pressed plunger 89 fixed to the handle 88 and adapted to engage with locating holes 90 and 91, Fig. 7.

The lever 77 controls the position of a movable speed indicating arrow or index 92, Fig. 13, through mechanism as follows: Fixed with the shaft 87 is a spur gear 93 engaging a gear 94 with which is fixed a gear 95 which engages a gear 96 on a pivoted plate 97. The plate 97 has fixed thereto the indicating arrow 92 shown in Fig. 13 which projects into an arcuate slot 99 cut in a cover plate 100. The ratio of the gears 93, 94, 95, 96 is such that rotating the lever 77 from the one to the other of the locating holes 90, 91 moves the arrow 92 from the one speed, as indicated on the dial 86, to the next adjacent speed.

The lever 77 also controls the rate effect of the various shiftable elements in the rate changer 26 through mechanism as follows: Gear 94, movable from lever 77, as previously described, engages a gear 101 fixed on a shaft 102, Fig. 7, upon which is also fixed a bevel gear 103, Figs. 7, 10, 11, 12. Bevel gear 103 engages a bevel gear 104 fixed on a shaft 105 upon which is also fixed a gear 106 engaging a gear 107. Fixed with gear 107 and eccentrically disposed relative to the gear axis is a pin 108 which carries a roller 109 engaging with a slot or groove in a movable member 110 slidably guided on a rod 111. Member 110 has forked end portions 112, 113, Fig. 8, which are fitted over shoulders or hubs 114, 115 of a member 116 slidably guided on a rod 117. The forked ends 112, 113 and the shoulders 114, 115 provide abutments for the opposite ends of a spring 118 retained thereby and which serves to resiliently establish a predetermined relative position between the members 110, 116. Member 116 has fixed therewith a fork 119 guided on a rod 120 and engaging side faces of the gears 53, 54. The arrangement is such that a movement of lever 77 from the one to the other of the locating holes 83, 84 moves the gear 107 through one-third of a revolution and eccentric pin 108 a sufficient distance for the gears 52, 53, 54 to be moved out of one engaged position into another. Also when the arrow 92 is in the position at the upper end of the arcuate slot, the gear 53, Fig. 5, is engaged to bring about the relatively slow one of the rate changes effected by the shifting of the gears 52, 53, 54. Then a movement of lever 77, which will move the arrow 92 downwardly to the next speed indicating position for the next higher speed, will move the gears 52, 53, 54 to engage the gear 54, and a still further movement to the next speed indicating position will engage the gear 52. Further movement of lever 77 to move the arrow 92 through the nine positions which are permitted by slot 99 repeats the three positions of gears 52, 53, 54 just described, but in addition brings about movements of the gears 44, 45, 46, as will be now described.

During the above described movements the gears 44, 45, 46 have remained in a position engaging the gear 46, whereby to bring about the slowest one of the three rate changes effected by the shifting of these gears. The gear 107 of the shifter train for transmission gears 52, 53, 54 has fixed therewith an intermittent gear 121 engaging with an intermittent gear 122 upon which is fixed an eccentric pin 123 which carries a roller 124 engaging a slot or groove in a movable member 125 guided on a rod 126 which shifts the gears 44, 45, 46 through a spring 127, Fig. 9, and fork member 128 similar to the shifter previously described for the gears 52, 53, 54. The intermittent gears 121, 122 are such that gear 122 remains stationary during the previously described movements of gear 107 and, as before stated, during such time the gear 46 has been engaged, but during the next succeeding movement of gear 107, whereby to shift gears 52, 53, 54 from the position engaging gear 52 to a position engaging gear 53, the intermittent gearing acts to also shift gears 44, 45, 46 to a position engaging the gear 44 which is productive of the next higher rate effect. This position of gears 44, 45, 46 is maintained during subsequent movements of lever 77 while the arrow 92 is moved through the next three speed indicating positions, that is to say, the fourth, fifth, and sixth positions of the series of nine speeds indicated by the arrow. During the next subsequent movement of lever 77, whereby to move arrow 92 from the sixth to the seventh speed indicating position, the intermittent gear 122 is again moved whereby to move the gears 44, 45, 46 from the position engaging gear 44 to a position engaging the gear 45 productive of the highest rate effect, which position is maintained during movements of lever 77 to move arrow 92 through the positions indicating the last three rates of the series of nine rates.

The above described rate change movements of lever 77 are obviously reversible in effect and the position of the arrow 92 at any time in either direction of its movement determines the rate effective on shaft 25 from the rate changer 26 provided pulley 16 is driven at a predetermined constant rate. It will be noted that the movement of shifter member 109, Fig. 8, is transmitted to fork member 119 only through spring 118 which permits the member 119 to lay behind the member 109 in either direction of shift, but continuously urges member 119 to assume the position corresponding to the member 109. Such construction is for the purpose of permitting lever 77 to be moved from the one to the other of its positions irrespective of the blocking of the engagement of the transmission gears 52, 53, 54 which may occur if the teeth strike the mating gear in certain positions. But if such blocking should momentarily occur, the movement of revolution of the one or the other of the mating gears will shortly permit engagement and the springs will bring it about immediately it becomes possible. Similarly for the gears 44, 45, 46 the shifter construction also permits the lever 77 to be shifted irrespective of blocking and renders certain that gear engagement will take place as soon as the blocking condition is destroyed.

The lever 76 controls the rate effect of the various shiftable elements in the rate changer 29 through mechanism as follows: The lever 76, as previously noted, rotates, on a bearing provided by shoulder 80, Fig. 7, on plate 78 and is held in place by the plate 100. Fixed with lever 76 is a gear 130 which engages with a gear 131, and fixed with gear 131 is a gear 132 engaging a gear 133 fixed on a shaft 134 upon which is also fixed a cam 135 which during rotation of shaft 134 shifts the transmission gear 65, Figs. 7, 5, into and out of engagement with its driving gear by the means of a member 136, Fig. 7, which has a fork portion engaging an annular groove 137 in the hub of gear 65 and also carries a cam follower pin 138 engaging the cam groove 139 in cam 135. The construction is such that when lever 76 is positioned for plunger 81, Fig. 7, to engage such a one of the locating holes 83, 84, 85, as will position index chart 86 to permit the movement of arrow 92 to pass over the nine highest speeds of the twenty-seven indicated speeds, then the transmission gear 65 will be engaged whereby the high speed train of the rate changer 29 is operative to drive spindle 10.

For engaging the intermediate and low speed trains of rate changer 29, lever 76 is connected to shift the gears 72, 74 as follows: The shaft 134, Fig. 7, which is movable from lever 76, as previously described, has fixed therewith an intermediate gear 140, Figs. 7–11, engaging an intermittent gear 141 fixed on a shaft 142, Figs. 6, 7, upon which is also fixed a member 143 carrying an eccentric pin 144 having a shoe 145 engaging a slot or groove in a member 146 fixed on a rod 147 upon which is also fixed a fork member 148 engaging the side faces of gear 72. The arrangement is such that movement of lever 76 from the high speed position previously described to a position where the index chart 86 positions the intermediate series of nine speeds to read against the various positions of arrow 92 will shift the gears 72, 74 to engage gear 72 to drive the spindle 10, and a movement of lever 76 to a position such that the lowest series of nine speeds is readable against the various positions of arrow 92 will engage gear 74 to drive spindle 10.

It will be noted that the eccentric 144 must retain the transmission gears 72, 74 both disengaged when transmission gear 65 is engaged, otherwise two different speed trains of rate changer 29 would be engaged simultaneously. This is accomplished by constructing the intermittent gears to position the eccentric 144 to disengage both gears 72, 74 and dwell in such position during all the period when cam 135 is positioned to move gear 65 out of its disengaged position.

It will also be noted that the movement of transmission gears 72, 74 out of disengaged position is greater for engagement of gear 74 than for gear 72, yet it is desirable that the eccentric pin 144 should stand in the central position of its movement when gears 72, 74 are disengaged. This could be accomplished by providing an otherwise unnecessary amount of movement to engage gear 72 whereby both engaging movements would be equal, but it is preferable to suitably slant or curve the slot 149, Fig. 7, of the member 146 whereby the effect of moving the eccentric through half its movement in one direction is less than the effect in the other direction.

Figure 10:
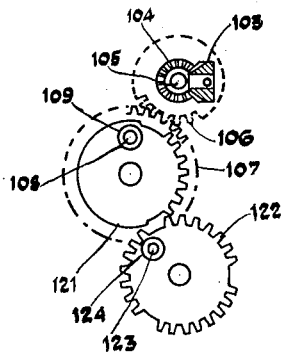
Figure 2:
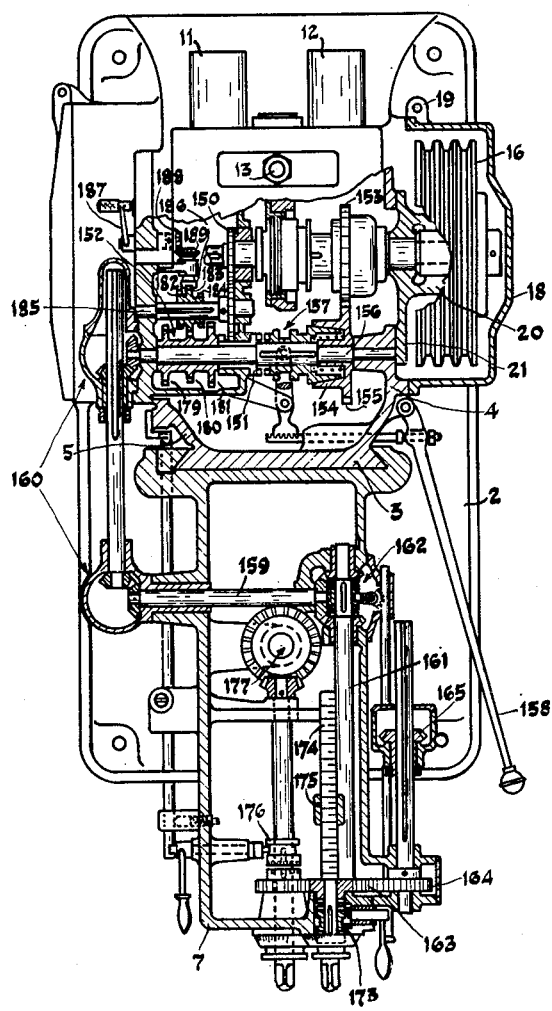
Fig. 2 is a horizontal section of the machine illustrated in Fig. 1, taken along the line 2—2 of Fig. 1.
Figure 3:
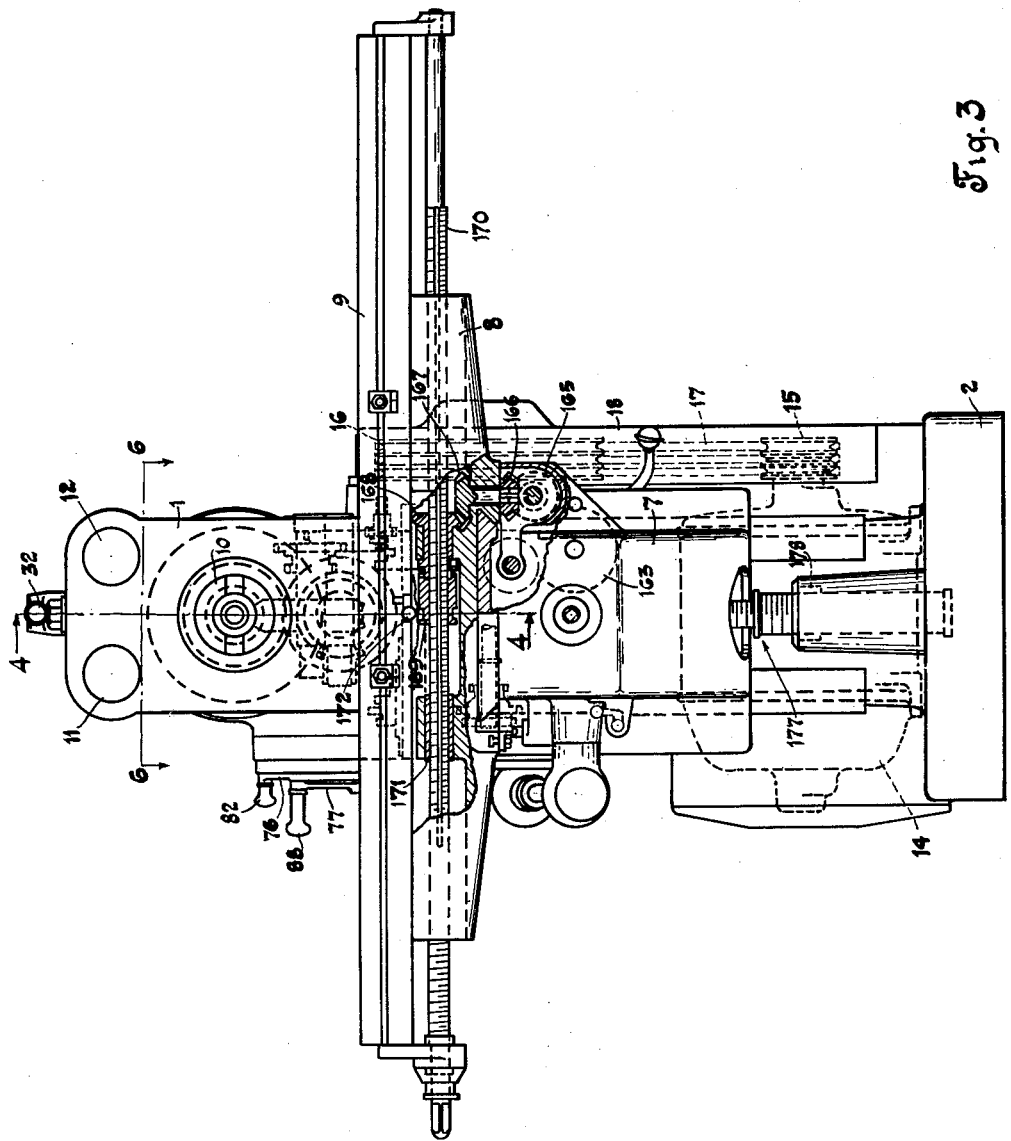
Fig. 3 is a front elevation of the machine partly in section.

Power means is provided to drive the table 9, the knee 7, and the saddle 8 in either direction of their movement and at a feed or quick traverse rate. The mechanism here shown for the purpose is of simplified form and is to be considered merely as typical of a variety of transmissions which might be used. A feed train originates in a gear 150, Figs. 2, 5, driven through the clutch 24 and drives a feed train terminal element 151, Fig. 2, through a rate changer generally denoted by the numeral 152. A quick traverse train originates in a gear 153 driven independently of the clutch 24 and drives a quick traverse train terminal element 154 through the gear 155. A shaft 156 may be alternatively driven from the one or the other of the terminal elements 151, 154, selection being made through a shiftable clutch device generally designated by the numeral 157 which is operable from a lever 158. The shaft 156 drives shaft 159 carried by the vertically movable knee through mechanism generally designated as 160, which permits of relative movement of the shafts. The shaft 159 drives a shaft 161 in either direction through a reverser generally designated by the numeral 162. The gear 163, Figs. 2, 3, meshes with gear 164 to drive the table through the gears 165, 166, 167, 168 and clutch 169 which is keyed to the screw 170 and may drive the table 9 through the nut 171 fixed in the saddle, the clutch being thrown into and out of engagement by the hand lever 172, Figs. 1, 3. Shaft 161, Fig. 2, may also drive the saddle through a clutch generally denoted by the numeral 173, a screw 174 and a nut 175. Shaft 161 may also drive the knee through a clutch 176, a vertical screw generally designated by the numeral 177 and a nut 178, Figs. 1, 2, 3. The feed rate changer 152, Fig. 2, may be of any convenient form but as here shown comprises three gears 179, 180, 181, fixed together for unitary axial movement for engagement one at a time with complementary gears 182, 183, and 184, which are rotatably mounted on the shaft 185. The shifting device for the feed rate changer comprises a fork mechanism 186 embracing the gear 183 on opposite sides and actuated by a lever 187 through a plurality of bevel gears 188, 189 and connecting shafts.

What is claimed is:

1. In a milling machine, the combination of an upstanding hollow column having front, rear and side walls, a tool spindle rotatably supported from said column at an upper level thereof, work support means comprising a knee, a saddle, a table supported for unitary vertical movement adjacent said front wall of said column and collectively providing table movement in three mutually transverse paths including a horizontal path at right angles to the axis of said spindle, transmission mechanism for rotation of said spindle including a motor housed within said column in a chamber at a level below said spindle and providing a motor shaft axially parallel with said horizontal path, another shaft at a level above said motor shaft and axially parallel therewith, driving means connecting said shafts, and a plurality of alternative trains of different rate transmitting effect connectible between said other shaft and said spindle, said rear wall being substantially closed and one of said side walls providing an opening for inserting said motor into said chamber.

2. In a milling machine, the combination of an upstanding hollow column having front, rear and side walls, a tool spindle rotatably supported from said column at an upper level thereof, work support means comprising a knee, a saddle, a table supported for unitary vertical movement adjacent said front wall of said column and collectively providing table movement in three mutually transverse paths including a horizontal path at right angles to the axis of said spindle, transmission mechanism for rotation of said spindle including a motor housed within said column in a chamber at a level below said spindle and providing a motor shaft axially parallel with said horizontal path, another shaft at a level above said motor shaft and axially parallel therewith, driving means connecting said shafts, and means for driving said spindle from said other shaft including a plurality of rate changers housed within said column at a level above said motor and arranged for the one to receive power through the other, said rear wall being substantially closed and one of said side walls providing an opening for inserting said motor within said chamber.

3. In a machine tool, the combination of a rotatable tool spindle, a front bearing for said spindle adjacent the tool end thereof, a rear spindle bearing at the other end thereof, a power source, a rate changer connectible between said source and spindle comprising a relatively low speed train terminating in a gear rigidly fixed on said spindle adjacent said front bearing and an alternatively available relatively high speed train terminating in a pair of elements, one of said pair of elements being a worm rigidly fixed on said spindle at a point between said gear and rear bearing and the other of said pair of elements being a worm wheel permanently meshed with said worm, said worm and wheel being of such character and form that either may drive the other and control mechanism for said rate changer including means preventing simultaneous driving of said spindle through said gear and elements.

4. In a milling machine, the combination of an upstanding hollow column, a tool spindle rotatably supported from said column at an upper level thereof, work support means comprising a knee, a saddle, a table supported for unitary vertical movement adjacent a front wall of said column and collectively providing table movement in three mutually transverse paths, a front bearing for said spindle adjacent the tool end thereof, a rear bearing for said spindle adjacent the other end thereof, an intermediate spindle bearing, a power source, transmission mechanism for driving said spindle from said source including a first rate changer and other rate change means comprising a relatively slow speed train terminating in an element engaging said spindle between said front and intermediate bearings and a relatively high speed train terminating in an element engaging said spindle between said rear and intermediate bearings and control mechanism for said transmission including means preventing simultaneous driving of said spindle through both of said elements.

5. In a milling machine, the combination of an upstanding hollow column, a tool spindle rotatably supported from said column at an upper level thereof, work support means comprising a knee, a saddle, a table supported for unitary vertical movement adjacent a front wall of said column and collectively providing table movement in three mutually transverse paths, a front bearing for said spindle adjacent the tool end thereof, a rear bearing for said spindle adjacent the other end thereof, an intermediate spindle bearing, a power source, transmission mechanism for driving said spindle from said source including a first rate changer and other rate change means comprising a relatively slow speed train terminating in a gear rigidly fixed with said spindle between said front and intermediate bearings and a relatively high speed train terminating in a pair of elements, one of said pair of elements being a worm rigidly fixed on said spindle at a point between said rear and intermediate bearings and the other of said pair of elements being a worm wheel permanently meshed with said worm, said worm and wheel being of a construction for either to drive the other and control mechanism for said transmission mechanism including means preventing simultaneous driving of said spindle through said gear and elements.

6. In a milling machine, the combination of an upstanding hollow column, a tool spindle rotatably supported from said column at an upper level thereof, work support means comprising a knee, a saddle, a table supported for unitary vertical movement adjacent a front wall of said column and collectively providing table movement in three mutually transverse paths, transmission mechanism for said spindle comprising a power source, a first rate changer driven from said power source and a second rate changer including three gears of different diameter on said spindle, the gear of largest diameter being rigidly fixed with said spindle adjacent the tool end thereof, the gear of smallest diameter being positioned adjacent the other end of said spindle, and the third gear being positioned on said spindle at a point between said large and said small gears and control mechanism for said transmission including means preventing simultaneous driving of said spindle through two of said three gears.

7. In a milling machine, the combination of an upstanding hollow column, a tool spindle rotatably supported from said column at an upper level thereof, work support means comprising a knee, a saddle, a table supported for unitary vertical movement adjacent a front wall of said column and collectively providing table movement in three mutually transverse paths, transmission mechanism for said spindle comprising a power source, a first rate changer driven from said power source and a second rate changer including three gears of different diameter on said spindle, the gear of largest diameter being rigidly fixed with said spindle adjacent the tool end thereof, the gear of smallest diameter being positioned adjacent the other end of said spindle and the third gear being positioned on said spindle at a point between said large and said small gears, said column providing bearings for said spindle at the opposite ends thereof and a third bearing between said third and smallest gear and control mechanism for said transmission including means preventing simultaneous driving of said spindle through any two of said three gears.

8. In a milling machine, the combination of an upstanding hollow column, a tool spindle rotatably supported from said column at an upper level thereof, work support means comprising a knee, a saddle, a table supported for unitary vertical movement adjacent a front wall of said column and collectively providing table movement in three mutually transverse paths, transmission mechanism for said spindle comprising a power source, a first rate changer driven from said power source and a second rate changer including three gears of different diameter on said spindle, the gear of largest diameter being a spur gear rigidly fixed with said spindle adjacent the tool end thereof, the gear of smallest diameter being a worm positioned adjacent the other end of said spindle, and the third gear being a spur gear positioned on said spindle between said largest and smallest gears and control mechanism for said transmission including means preventing simultaneous actuation of said spindle through two of said gears.

9. In a milling machine, the combination of an upstanding hollow column, a tool spindle rotatably supported from said column at an upper level thereof, work support means comprising a knee, a saddle, a table supported for unitary vertical movement adjacent a front wall of said column and collectively providing table movement in three mutually transverse paths, transmission mechanism for said spindle comprising a power source, a first rate changer driven from said power source and a second rate changer including three gears of different diameter on said spindle, the gear of largest diameter being a spur gear rigidly fixed with said spindle adjacent the tool end thereof, the gear of smallest diameter being a worm positioned adjacent the other end of said spindle, and the third gear being a spur gear positioned on said spindle between said largest and smallest gears, said column providing bearings for said spindle at the opposite ends thereof and another bearing between said third and smallest gears and control mechanism for said transmission including means preventing simultaneous connection of said power source to any two of said gears.

10. In a milling machine, the combination of an upstanding hollow column, a tool spindle rotatably supported from said column at an upper level thereof, work support means comprising a knee, a saddle, a table supported for unitary vertical movement adjacent a front wall of said column and collectively providing table movement in three mutually transverse paths including a horizontal path at right angles to the axis of said spindle, transmission mechanism for rotation of said spindle including a motor housed within said column at a level below said spindle and providing a motor shaft axially parallel with said horizontal path, another shaft at a level above said motor shaft and axially parallel therewith, driving means connecting said shafts, including a motion interrupting clutch, a plurality of alternatively available trains respectively of different rate transmitting effect connectible between said other shaft and said spindle through said clutch, and a plurality of alternatively available trains respectively of different rate effect connectible for movement of said table, one of the last mentioned plurality of trains being driven from said motor shaft exclusive of said clutch.

EDWARD J. KEARNEY.